D. McKENZIE.
Bakers' Oven.
No. 6,397. Reissued April 20, 1875.
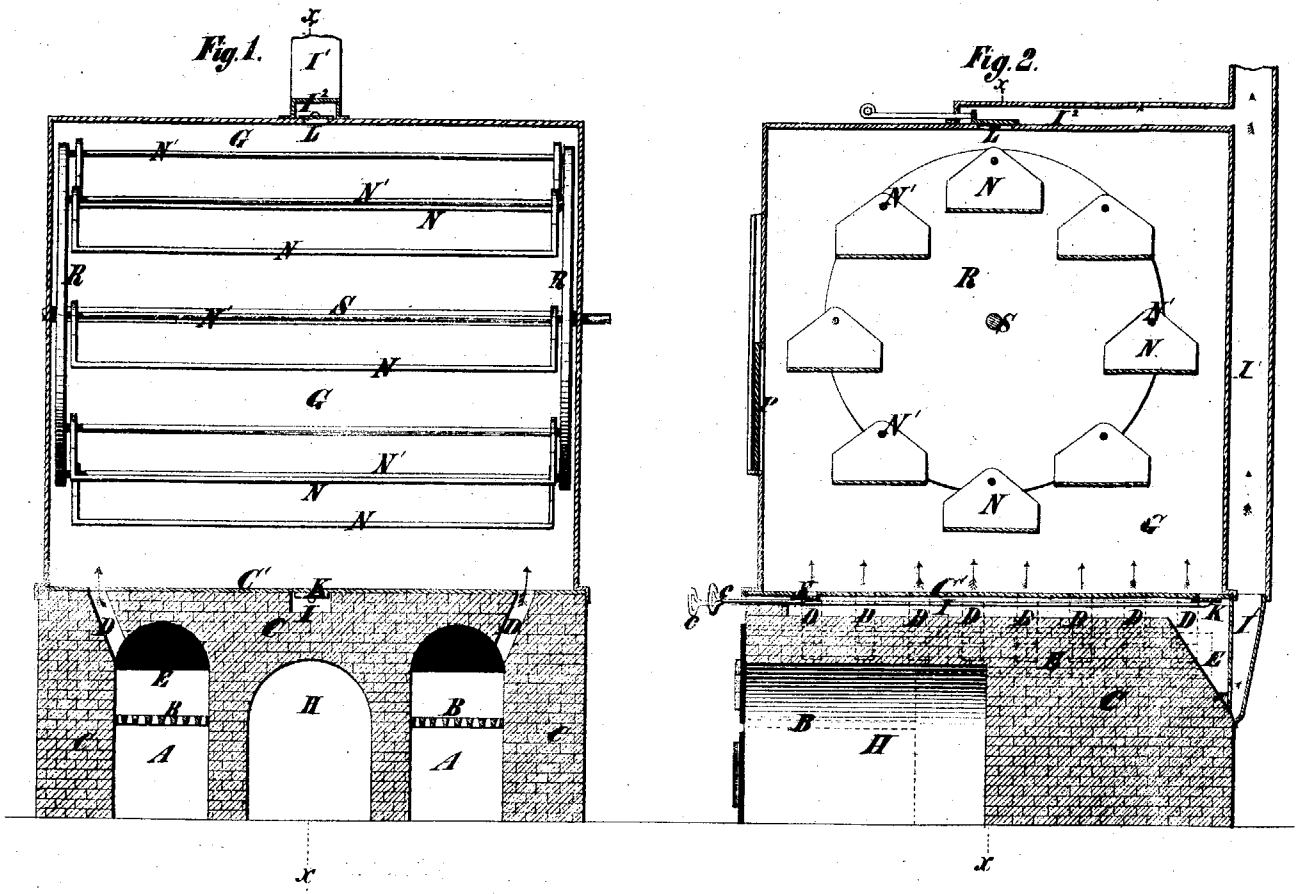
Witnesses:
T. J. Keane
A. J. De Lacy
Inventor.
Duncan McKenzie

UNITED STATES PATENT OFFICE.

DUNCAN McKENZIE, OF BROOKLYN, NEW YORK.

IMPROVEMENT IN BAKERS' OVENS.

Specification forming part of Letters Patent No. 28,130, dated May 1, 1860; reissue No. 3,929, dated April 19, 1870; extended seven years; reissue 6,397, dated April 20, 1875; application filed April 5, 1875.

*To all whom it may concern:*

Be it known that I, DUNCAN McKENZIE, of Brooklyn, in the county of Kings and State of New York, am the first and original inventor of certain new and useful Improvements in Bakers' Ovens; and I do hereby declare that the following is a full, clear, and exact description of the same, reference being had to the accompanying drawing, which forms a part of this specification, and in which—

Figure 1 represents a transverse vertical section of an oven embodying my said invention, the section being taken on the plane of the line *x x*, Fig. 2; and Fig. 2 is a vertical longitudinal section, taken through the oven in the plane indicated by the line *x x* in Fig. 1.

This invention consists, first, in the combination, in an oven for baking bread and other substances, of the following elements: a furnace or fire-place, (one or more,) a baking-chamber arranged above such furnace or fire-place, and in direct communication therewith, and a rotating reel located within said baking-chamber, and provided with gravitating pans or shelves, arranged or hung around the shaft of said reel from rods attached to the end plates or arms thereof, whereby I produce a continuously-baking oven, in which the bread or other substances are subjected to the direct action of the gaseous products of combustion ascending from the lower portion or bottom of the oven; second, in an arrangement of flues or openings communicating from the fire-place or fire-places with the baking-chamber directly through the floor of the latter; third, in certain combinations and arrangements of exit-flues, as will be hereinafter described, for securing a proper circulation of the gaseous products of combustion through the oven or baking-chamber, both when baking and when lighting the fire. The oven represented has two fire-places, but the number is immaterial to the invention.

A A are fire-places, which are illustrated as being formed in brick-work C, with their grates B and ash-pits extending back a suitable distance from the front, as represented in dotted lines in Fig. 2, and with a coal-receptacle, H, between them. From the back of each fire-place a bed, E, of brick-work is built up, extending to the rear wall of the oven, and forming, with the continuation of the fire-place, a horizontal space or flue extending to the rear of the oven. D D are a series of flues or openings, which lead off from the fire-places and the spaces over the beds E, and communicate directly, through the floor C C′, with the interior of the oven G, which is arranged above the masonry, thereby establishing direct communication between the fire-place and baking-chamber. These short flues are the only means of escape for the gaseous products of combustion from the fire-places, and also of the heat from the furnace, except what little will be absorbed and given out by radiation from the brick-work above the arch in the oven, and they (the flues) are sufficiently numerous to allow of the free and rapid passage of the gaseous products of combustion from the fire-places directly into the oven, and their diffusion through the oven. Between the two furnaces, and extending from the front to the rear of the oven, directly under the floor thereof, is a horizontal flue, I, which communicates with a vertical flue, $I^1$, extending up in rear of the oven, as shown by Fig. 2, and forming or leading to the chimney. The horizontal flue I communicates with the oven through holes in its front and rear, which are closed by valves K K, Fig. 2, which valves can be operated from the front of the oven by means of damper-rods *c c*. This flue I is the exit-flue, by which the gaseous products of combustion escape from the oven through the openings of the valves K K. The rear end of the flue I, which communicates with the flue $I^1$, is enlarged into a chamber, and bent downward, somewhat in the form of an inverted cone. The point of communication with the flue $I^1$ is at the lower part of this chamber.

By this enlargement and downward projection of flue I the draft of flue $I^1$ acts equally upon the contents of flue I, drawing off the same more evenly and freely than if the flue I were continued horizontally out, and opened directly into flue $I^1$.

If the flue I were extended horizontally, as stated, the draft through the damper-opening at the back end of the flue I would be greater than the corresponding opening at the opposite end; but, by the enlargement and downward extension of the rear end of the flue I, the draft through both damper-openings K is rendered uniform, and the baking operation thus improved, and fuel saved.

In the center of the top of the oven is a valvular opening, L, which communicates with the main flue $I^1$ by a horizontal flue, $I^2$, as clearly represented by the drawings. In the oven G are arranged a suitable number of gravitating pans or shelves, N, which are hung from a reel composed of rods N′, extending across between two circular revolving plates, R R, which are turned by a shaft, S, having its bearing in each side of the oven. The pans containing the bread or other substances are placed on these swinging shelves N, and this reel, with its gravitating pans or shelves, is caused to revolve by turning the shaft S. The bread on all the shelves is thus made to receive a uniform heat. The bread-pans are placed in, and removed from, the oven through door P, Fig. 2.

When the fires are built up in the furnaces, and the dampers in the top of the oven opened, a direct ascending draft will take place, and the smoke and gases of combustion will all escape through the flue $I^2$; but when the fires are well lighted this damper should be closed, and either or both of the dampers K K in the lower central and horizontal flue I may be opened, or partially opened, when a downward draft will take place, and the heated air and gaseous products, which enter the oven or baking-chamber directly from the fire-places, will rise to the top of the oven on the sides, and then descend in the center of the oven to the central flue I, and escape thence up the main flue $I^1$. The heated air and gases will thus be made to circulate and rotate in the oven, and diffuse their heat through the entire oven in a uniform and rapid manner.

What I claim as my invention, and desire to secure by Letters Patent, is—

1. The combination of the following elements, to wit: a furnace or fire-place, (one or more ) a baking-chamber arranged above such furnace or fire-place, and in direct communication therewith, and a rotating reel located within said baking-chamber, and provided with gravitating pans or shelves, arranged or hung around the shaft of said reel from rods attached to the end plates or arms thereof, substantially as and for the purpose described.

2. A system of flues communicating between the fire-places and the interior of the oven directly through the floor or bottom of the latter, substantially as herein described.

3. The combination of the flues D, escapes K K, and flue I in the lower part or floor of the oven C′, for the purpose herein shown and described.

4. The flue I, having its rear end constructed with an enlargement and downward extension, in combination with the flue $I^1$, substantially as set forth.

5. The combination, with the oven G, of the flues $I^2$ $I^1$ I D and the dampers K K and L as and for the purpose herein shown and described.

DUNCAN McKENZIE.

Witnesses:
T. J. KEANE,
A. J. DE LACY.